(12) United States Patent
Rigg

(10) Patent No.: US 6,293,284 B1
(45) Date of Patent: Sep. 25, 2001

(54) VIRTUAL MAKEOVER

(75) Inventor: Richard T. Rigg, Springfield Gardens, NY (US)

(73) Assignee: Division of Conopco, Inc., New York, NY (US)

( * ) Notice: Subject to any disclaimer, the term of this patent is extended or adjusted under 35 U.S.C. 154(b) by 0 days.

(21) Appl. No.: 09/567,280

(22) Filed: May 8, 2000

Related U.S. Application Data

(60) Provisional application No. 60/142,601, filed on Jul. 7, 1999.

(51) Int. Cl.$^7$ .............................. A45D 24/00; G09B 23/38
(52) U.S. Cl. .............................................. 132/200; 434/262
(58) Field of Search ............................ 132/200; 434/100, 434/98, 81, 262; 382/128, 294, 130, 151; 364/400, 413.01, 479.02

(56) References Cited

U.S. PATENT DOCUMENTS

| | | | |
|---|---|---|---|
| 4,232,344 | 11/1980 | Dyson | 358/93 |
| 4,539,585 | 9/1985 | Spackova et al. | |
| 4,909,632 | 3/1990 | McFarlane | 356/402 |
| 4,911,544 | 3/1990 | Walsh | 350/600 |
| 5,003,500 | 3/1991 | Gerber | 364/526 |
| 5,478,238 | 12/1995 | Gourtou et al. | 434/100 |
| 5,495,338 | 2/1996 | Gouriou et al. | 434/100 |
| 5,622,692 | 4/1997 | Rigg et al. | 434/63 |
| 5,687,259 | 11/1997 | Linford | 382/294 |
| 5,785,960 | 7/1998 | Rigg et al. | 434/63 |
| 5,825,941 | 10/1998 | Linford et al. | 382/294 |
| 5,854,850 | 12/1998 | Linford et al. | 382/294 |
| 5,893,373 | * 4/1999 | Reynolds | 132/200 |
| 5,924,426 | * 7/1999 | Galazin | 132/200 |
| 6,000,407 | * 12/1999 | Galazin | 132/200 |

FOREIGN PATENT DOCUMENTS

| | | |
|---|---|---|
| 34 19 568 | 5/1984 | (DE) . |
| 41 10 299 | 3/1991 | (DE) . |
| 0 226 959 | 7/1987 | (EP) . |
| 0 828 230 | 9/1996 | (EP) . |
| 1 030 267 | 3/1997 | (EP) . |
| 2 728 982 | 12/1994 | (FR) . |
| 11143352 | 5/1999 | (JP) . |
| 97/29441 | 8/1997 | (WO) . |
| 99/23609 | 5/1999 | (WO) . |

* cited by examiner

Primary Examiner—John J. Wilson
Assistant Examiner—Robyn Kieu Doan
(74) Attorney, Agent, or Firm—Milton L. Honig

(57) ABSTRACT

A method and apparatus is provided for virtual color makeover of a customer's face. A digital image is taken of the customer's face. Natural skin color is determined by a differential analysis among at least two different sites along the face to identify an area without color. The identified area without color is then used as a basis for projecting the customer's face with the natural skin color. Consultant's choice of preprogrammed color palettes matching the measured natural skin color is then projected on the facial image. A customer's personal choice such as fashion, natural or go-to-work looks can be registered for modifying the consultant's choice color palette. The selected color palette can then be identified as a set of color cosmetic products which are provided to the customer.

10 Claims, No Drawings

VIRTUAL MAKEOVER

This appln claims benefit of prov appln 60/142,601 Jul. 7, 1999.

BACKGROUND OF THE INVENTION

1. Field of the Invention

The invention concerns a method and apparatus for allowing a consumer at point-of-sale to evaluate color cosmetic products on their virtual facial image prior to purchase.

2. The Related Art

Color cosmetics encompass among others lipsticks, eyeliner, blush, lipliner, eye shadow and facial foundation. A vast array of colors and shades are available to consumers. Often the consumer finds it difficult to select among this vast array of choices. It is difficult to decide how a particular color or shade will look when actually spread on the skin. Even more difficult to assess is how a combination of color cosmetic products such as facial foundation, lipstick and eyeshadow will work together for a particular individual. Systems have been developed to assist the decision process. Clinique and Clarion have installed computers at sales counters for use by the consumer. Information on color shade, oiliness and other properties of a consumer's skin are punched into the computer which then determines the company's most closely matching product.

Another point of sale technique has been that of custom blending. Two major companies, Prescriptives (division of Estee Lauder) and Visage (division of Revlon) begin a sale by manually evaluating a subject's skin color. The sales person then adjusts existing finished foundations so as to match the evaluated skin color for a perfect facial foundation. Unfortunately, the system is time consuming, requires extensively trained sales persons, and has poor reproduceability.

U.S. Pat. Nos. 5,854,850, 5,825,941 and 5,687,259 all to Linford et al. assigned to the Mirror Software Corporation disclose a system for digital image capture of a particular person's face and software to manipulate facial structures. The system is intended for reconstructive plastic surgery.

It is evident that relatively unsophisticated systems are available for color matching. The technology also exists for digital recording of individual faces. To date there has been no disclosure of systems which utilize digital imagery for cosmetic products. Neither has there been reported any systems for obtaining virtual makeover of a consumer's image whereby the consumer can see the effect of different color cosmetic products on their own face.

Accordingly, it is an object of the present invention to provide a method and apparatus for forming a virtual makeover of a person's face on an image monitor so as to allow selection of the best color combinations.

Another object of the present invention is to provide a method and apparatus for virtual makeover at a point of sale counter wherein color makeup can be electronically painted over the consumer's image without requiring actual removal of make-up prior to obtaining a baseline natural skin color image.

These and other objects of the present invention will become more apparent from the following summary and detailed description.

SUMMARY OF THE INVENTION

A method is provided for applying a virtual makeover to a person's face, the method involving:

(i) directing a digital camera at a person's face to register an image of at least a portion thereof;
(ii) calculating color parameters on two or more areas of the image to identify a natural color of the skin;
(iii) transmitting the image to a monitor for displaying the face;
(iv) correlating the natural skin color with a predetermined palette of colors appropriate to the calculated natural skin color;
(v) locating areas of the face for application of a color cosmetic;
(vi) displaying the facial image with the predetermined color palette on the located areas; and
(vii) optionally placing an order for color cosmetics corresponding to the predetermined color palette.

Also provided is an apparatus for applying virtual makeover to a person's face, the apparatus including:

(i) a digital camera for acquiring information on the person's facial image;
(ii) a program for calculating color on two or more different areas of the facial image not normally covered by cosmetics to identify a natural color of the person's skin;
(iii) a monitor for displaying the facial image;
(iv) a program for painting a predetermined color palette correlated with the natural skin color onto certain located areas of the face normally subject to color cosmetic treatment; and
(v) a printer delivering a printout of the predetermined color palette.

DETAILED DESCRIPTION OF THE INVENTION

A problem with prior attempts to visualize color cosmetics for customers has been the inability to determine their natural skin color. Now it has been found that natural skin color can be determined via digital imaging by comparing $L^*a^*b$ color values on at least two different areas of the facial image. Consumers do not place makeup over 100% of their face. The digital scan identifies those areas of skin which are not covered by makeup, provides a color value for that area and utilizes the value as a baseline color for re-imaging a cosmetically stripped face onto a monitor.

Another challenge for the system was to locate those areas of the face upon which color cosmetics can be applied electronically. The program locates color requiring areas such as the lips, cheeks and eyes.

A digital image of a customer's face may be taken at a point-of-sale department store counter for storage into a central memory and then made available at a website. The image may also be storable locally at the store or within an intranet system of the cosmetic supplier. Also envisioned is the alternative possibility for the customer scanning their own actual image from their home computer. Many of these customers now have relatively inexpensive digital imaging cameras interfaceable with personal computers and thereby can connect directly to the internet.

Once the natural skin color has been identified, a consultant's choice is automatically determined from a software stored set of 12–20 colors matching the person's skin type. This provides a color matching facial foundation for building the first stage of color makeover. Feedback is then accepted into the program on the customer's own preferences. For instance, these preferences can be with respect to three possible "looks" such as fashion, natural or go-to-work types.

A lipstick can then be provided as a consultant's best choice. The customer can also provide input for her favorite color. The pick may be a natural or dramatic look. These choices are then fed directly into the program for facial display on the monitor.

Other color cosmetics can be applied in the same consultant's choice and consumer preference feedback mode. These cosmetics can include eye shadow, eyeliner, lipliner and blush. The monitor can display images from no makeup to full makeup with all products or any step in between.

When a particular look including all the necessary color cosmetics have been selected, a printer is activated with an ordering slip for the selected cosmetics. The customer is identified by a number and the selected products given a barcode symbol or other designation correlating the product with the customer.

The customer's image can be placed on an internet site. At some subsequent time, the customer can view the internet site and from the comfort of their own terminal evaluate various makeovers on their face. Cosmetics to accomplish the actual makeover can then be ordered on the web site or through any other channel.

Equipment for the method includes a digital camera available from several sources. Nikon provides a suitable high resolution digital camera under the trademark Coolpix 900™ providing an image size of 1080×960 pixels, VGA mode 640×480. Another digital camera which may be utilized is the PhotoGenie™ sold with the ePHOTO 1680 camera by the Agfa Corporation. Image size is 1280×1200 pixels, VGA mode 640×480. Software for operating the system can be obtained from Torchlight Corporation of Seattle. Programs upon which this software is based are found in U.S. Pat. Nos. 5,854,850, 5,825,941 and 5,687,259 all herein incorporated by reference.

The foregoing description illustrates selected embodiments of the present invention and in light thereof variations and modifications would be suggested to one skilled in the art, all of which are within the spirit and purview of this invention.

What is claimed is:

1. A method for applying a virtual makeover to a person's face, the method comprising:

(i) directing a digital camera at a person's face to register an image of at least a portion thereof;

(ii) calculating color parameters on two or more areas of the image to identify a natural color of the skin;

(iii) transmitting the image to a monitor for displaying the face;

(iv) correlating the natural skin color with a predetermined palette of colors appropriate to the calculated natural skin color;

(v) locating areas of the face for application of a color cosmetic;

(vi) displaying the facial image with the predetermined color palette on the located areas; and (vii) optionally placing an order for color cosmetics corresponding to the predetermined color palette.

2. An apparatus for applying virtual makeover to a person's face, the apparatus comprising:

(i) a digital camera for acquiring information on the person's facial image;

(ii) a computer having a program for calculating color on two or more different areas of the facial image not normally covered by cosmetics to identify a natural color of the person's skin;

(iii) a monitor for displaying the facial image;

(iv) a program for painting a predetermined color palette correlated with the natural skin color onto certain located areas of the face normally subject to color cosmetic treatment; and (v) a printer delivering a printout of the predetermined color palette.

3. The method according to claim 1 wherein the located areas are lips and in step (vi) displaying on the lips a lipstick of a color other than that of the natural color of the skin.

4. The method according to claim 1 wherein the located areas are around the eyes and in step (vi) displaying around the eyes an eyeliner or eye shadow of a color other than the natural color of the skin.

5. The method according to claim 1 further comprising the step of assigning to a customer, represented by the person's face, a barcode symbol or other designation correlating ordered color cosmetics with the customer.

6. The method according to claim 1 further comprising inquiring with a customer represented by the person's face on their own color preferences which input is then registered to change the color of the located areas of the displayed facial image.

7. The apparatus according to claim 2 wherein the located areas are lips and the painting program displays on the lips a lipstick having a color other than that of the natural color of the skin.

8. The apparatus according to claim 2 wherein the located areas are around the eyes and the painting program displays around the eyes an eyeliner or eye shadow of a color other than the natural color of the skin.

9. The apparatus according to claim 2 wherein the painting program further registers identifying the person's face as belonging to a customer identified as a barcode symbol or other designation correlating an ordered color cosmetic with the customer.

10. The apparatus according to claim 2 wherein the painting program further includes inquiring with a customer represented by the person's face on their own color preferences which input is then registered to change the color of the located areas of the displayed facial image.

* * * * *